No. 630,075. Patented Aug. 1, 1899.
W. A. ROOT.
METHOD OF AND APPARATUS FOR PRODUCING ACETYLENE GAS.
(Application filed May 7, 1895.)
(No Model.)
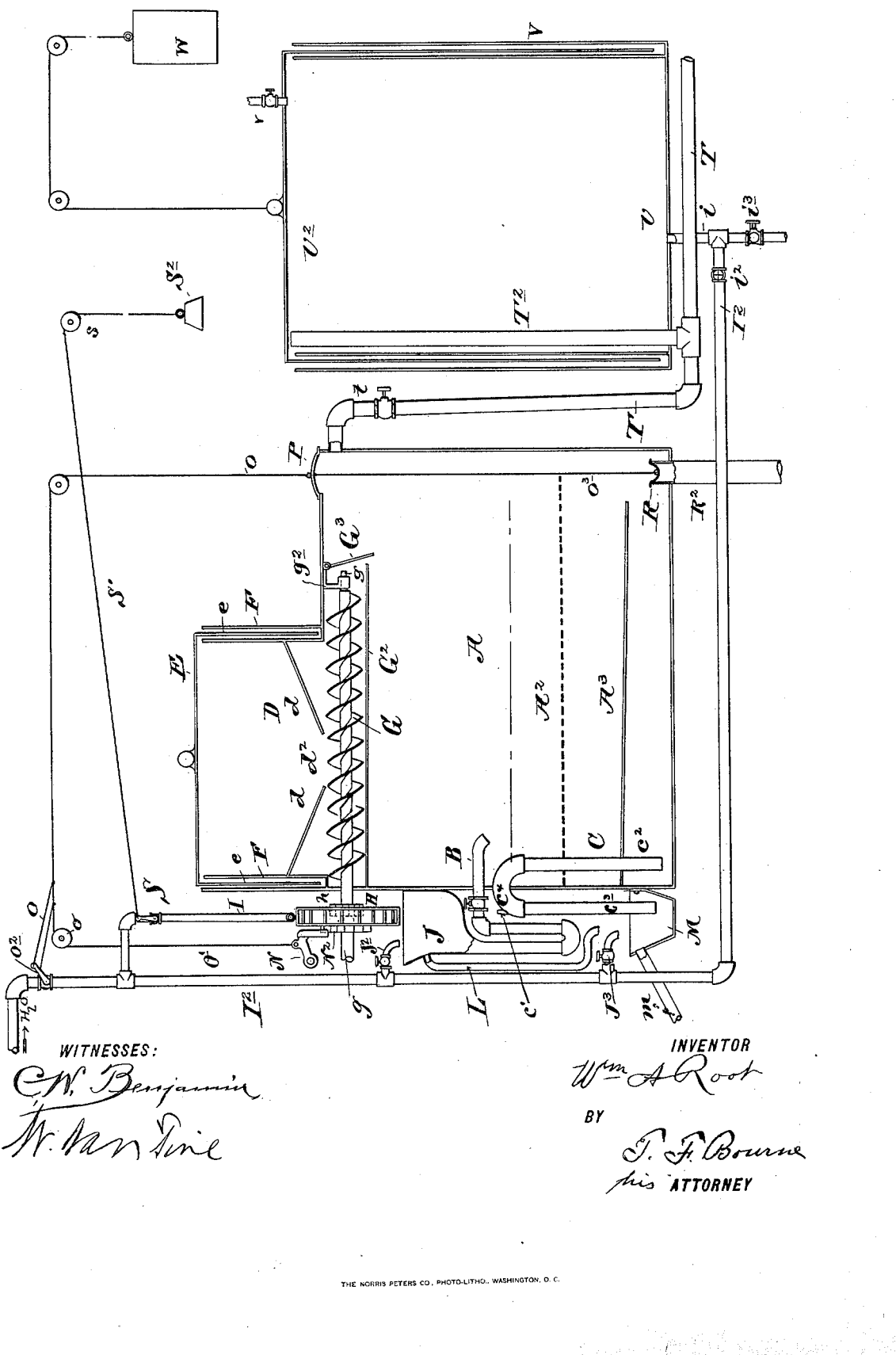

UNITED STATES PATENT OFFICE.

WILLIAM A. ROOT, OF LAKEWOOD, NEW JERSEY.

METHOD OF AND APPARATUS FOR PRODUCING ACETYLENE GAS.

SPECIFICATION forming part of Letters Patent No. 630,075, dated August 1, 1899.

Application filed May 7, 1895. Serial No. 548,420. (No model.)

*To all whom it may concern:*

Be it known that I, WILLIAM A. ROOT, of Lakewood, Ocean county, New Jersey, have invented certain new and useful Improvements in Methods of and Apparatus for Producing Acetylene Gas, of which the following is a specification.

It is well known that when calcic carbid (or an alkali-metal or alkaline-earth-metal carbid) is placed in water acetylene gas is immediately evolved, which gas can be used to advantage for illuminating and heating purposes.

The object of my invention is to produce acetylene gas from calcic carbid by introducing the latter into water and conducting away the gas evolved, the gas being generated in about the proportions used, so that when the gas is not being used its production will cease and when it is desired to use it its production will commence automatically and continue in proportion to its consumption.

My improved method of producing acetylene gas consists in placing calcic carbid in water, decomposing said carbid and evolving acetylene gas, drawing off the gas so evolved, and supplying new calcic carbid to the water to produce more gas.

The method also consists in supplying continuously new water and new calcic carbid thereto to decompose said calcic carbid and evolve acetylene gas, the continuous supply of water providing new oxygen and hydrogen to act on the incoming calcic carbid.

The method also consists in stopping or arresting the production of the acetylene gas by means of the pressure or volume of said gas when it exceeds a predetermined point.

The invention also consists in a tank or reservoir and means for continuously supplying calcic carbid thereto in requisite quantities, in combination with means for supplying said tank or reservoir with fresh water as the calcic carbid acts on the oxygen and hydrogen of the water.

The invention further consists in the combination, with said tank or reservoir and the means for supplying it with calcic carbid and water, of means for regulating or stopping said supply of calcic carbid and water when the gas generated exceeds a predetermined quantity or pressure, whereby the generation of the gas is automatically regulated in accordance with the quantity used.

The invention further consists in the details of improvement and the combinations of parts that will be more fully hereinafter set forth and then pointed out in the claims.

Reference is to be had to the accompanying drawing, forming part hereof, which is a diagrammatic representation, partly in section, of an apparatus for carrying out my invention.

In the accompanying drawing, in which similar letters of reference indicate corresponding parts, the letter A indicates a suitable tank having a water-inlet pipe B and an outlet-pipe C.

D is a chamber or receptacle at the top of the tank A and leading thereto, as shown, the receptacle having a cover E, as shown. The chamber or receptacle D is adapted to contain the calcic carbid for producing the acetylene gas, and it is shown provided with an inclined hopper-like bottom $d$, having an opening $d^2$ for the delivery of the calcic carbid. The cover E has depending walls $e$, that enter a pocket F on the tank or reservoir A, which is filled with water, glycerin, or other suitable fluid to make a gas-tight seal between the cover E, chamber D, and tank A.

G is a worm or screw at and within the upper part of the tank A and beneath the chamber D and arranged to feed the calcic carbid in requisite quantities from the chamber D to the tank A. The worm or screw G is located within a tube or chute $G^2$, which at the delivery end has a valve or flap-door $G^3$, arranged to close the tube or chute $G^2$ by the gas-pressure in the tank A or by its own gravity when the calcic carbid is not passing into the tank A. The axis or shaft $g$ of the worm or screw G is shown supported at one end by a bearing or bracket $g$ within the tube or chute $G^2$, and at its opposite end said axis or shaft passes through the side of the tank or reservoir A, where it may be suitably journaled.

The worm or screw G may be rotated by suitable means to feed the calcic carbid to the tank A. I have shown said worm as actuated by a water-wheel or turbine H, which is operated by water issuing from a pipe I, leading from a pipe $I^2$, connected with a suitable source of supply. (Not shown.) To produce the desired amount of power with the requisite speed, the worm G may be geared to the wheel H by suitable gearing h.

It is designed that the water from the pipe I, which operates the worm or screw G to feed the calcic carbid to the tank A, shall also serve to supply said tank or reservoir with the water that receives said carbid, so that a fresh supply of water shall be maintained in said tank commensurate with the incoming calcic carbid. For this purpose a hopper J is shown located beneath the water-wheel H and connected with the pipe B, that leads into the tank or reservoir A, as shown, the hopper J being above the pipe B, so as to produce the requisite head for the water to pass through said pipe.

L is an overflow-pipe leading from the hopper J to a water-receptacle M, from which an overflow-pipe $m$ leads to a sewer or elsewhere. The outlet-pipe C for the tank $a$ is shown provided with two legs, one, $c^2$, in said tank and the other, $c^3$, leading into the receptacle M to receive the overflow from the tank A. The bend $c^4$ of the pipe C passes through the wall of the tank A and determines the water-level in said tank. The bottom of the leg $c^6$ of pipe C is above the end of leg $c^2$, and the leg $c^8$ has a vent $c'$ to prevent siphoning of the water from the tank A. The pipe $I^2$ has a cock $J^2$ leading to the hopper J to supply the tank or reservoir A with water through pipe B when the operation of producing the gas is started and when the tank at any time is empty. This is merely a convenient means of first supplying the tank with water to start the operation. A cock $J^3$ on pipe $I^2$ also serves to supply the receptacle M with water to keep air from passing into the tank A through pipe C.

$A^2$ is a grating or perforated shelf within the tank A below the normal water-level and upon which the calcic carbid rests when delivered into the tank A by the worm or screw G.

$A^3$ is a shelf within the tank A below the grating or perforated shelf $A^2$ and preferably inclined rearwardly, as shown, leaving a space at its inner end for the passage of water. The lime decomposed from the calcic carbid by the action of the water settles upon the shelf $A^3$ and is carried away by the current of water passing through the tank A.

When the calcic carbid is deposited in the water in tank or reservoir A, acetylene gas is immediately evolved and if not consumed or carried away sufficiently fast will create a pressure within the tank, and when this pressure reaches a certain point I desire that the production of the gas shall cease or lessen until the pressure is reduced. For this purpose I provide a diaphragm P in the upper part or top of the tank or reservoir A, which is connected by a cord, chain, or other flexible connection O with a weighted or spring-acting cock or valve $O^2$ in pipe $I^2$, so arranged that as the diaphragm P rises the cock $O^2$ will turn to shut off the supply of water to pipe I. The cord or chain O has an extension O', shown passing over a sheave $o$ and leading to a pawl N, which is adapted to engage a ratchet-wheel $N^2$, connected with shaft $g$ or wheel H, so that when cock $O^2$ is shut the pawl $N^2$ will act to stop the rotation of wheel H. To further reduce the pressure of the gas in the tank A when it is sufficiently great to operate the diaphragm P, I connect said diaphragm by a chain, wire, or rod $O^3$ with a suitable valve R on a supplemental outlet-pipe $R^2$ at the bottom of the tank A, so that as the diaphragm P rises the valve R will be raised, and thus allow the escape of water from the tank A, whereby increased space is made in said tank for the gas, and the surplus carbid therein is deprived of water, the production of gas ceases, and thus the pressure of the gas becomes reduced.

T is an outlet-pipe for the gas, shown leading from the upper part of the tank A, the pipe T having a cock $t$ to regulate or prevent the passage of gas. The pipe T may lead directly to the service-pipes for the gas. I have shown it also connected with a gas holder or receiver U by a branch pipe $T^2$, which leads to the upper part of the holder U. The holder U has a water-seal V for its top $U^2$ and a balance-weight W for said cover, as usual in gas-holders. The pipe $I^2$ is also shown connected by a branch pipe $i$ with the bottom of the holder U, the pipe $I^2$ having a cock $i^2$ and the branch pipe $i$ having a cock $i^3$. With this arrangement when the process of generating acetylene gas is started the cock $i^3$ will be closed and the cock $i^2$ opened. Water will thereupon enter holder U and expel air therefrom through a suitable air-valve $v$ at the top of the holder, the water being allowed to enter the holder nearly to the top of pipe $T^2$. Cock $i^2$ can then be closed and cock $i^3$ opened to permit the escape of the water from the holder, the valve $v$ closing to prevent the entrance of air and the escape therethrough of gas from the tank U after it enters the latter from tank A. Cock $i^3$ will next be closed. This is a convenient means for removing air from the holder U to provide space for the gas generated in the tank A, it being desirable to keep the acetylene gas from mixing with air, owing to the explosive nature of said gas when so mixed with air.

When the gas from the tank or generator A fills the holder U, it will tend to raise the top $U^2$, and when the holder U is quite full of gas it is desired that the generation of the gas will cease until some of it has been drawn from the holder. For this purpose the pipe I is shown provided with an automatically-closing valve S, connected by a rope or chain S' (passing over a sheave $s$) with a weight $S^2$, which is directly over the cover $U^2$ of the holder U, the weight $S^2$ serving to open the valve S when allowed to exert its force thereon. When the gas in the holder U increases sufficiently in volume and pressure, it will raise the cover $U^2$ until the latter engages and lifts the weight $S^2$, whereupon the valve S will be closed. The water-supply in pipe I will thereupon cease and the worm G will stop delivering calcic carbid to the water in tank A. As soon as enough gas has been drawn from holder U to allow cover $U^2$ to sink slightly the weight $S^2$ will descend to open valve S, whereupon water will again flow from pipe I to turn worm G to supply calcic carbid to the tank, the new supply of water likewise entering tank A through pipe B. A further increase of gas in the holder U will again raise weight $S^2$ to stop the production of gas, and so on. By this means the generation of gas is automatically controlled and regulated in accordance with its consumption.

The complete operation is as follows: The tank or generator A is first supplied with water up to the water-level $c^4$ by opening cock $J^2$ and allowing water to pass through pipe B, cock $J^2$ then being closed. Chamber D is also charged with calcic carbid and the cover E fitted on and sealed with fluid at F. The air is exhausted from receiver or holder U, as before explained. Cover $U^2$ now being down allows valve S to open under the influence of weight $S^2$. Water now issues from pipe I and rotates water-wheel H, which operates worm or screw G at the requisite speed. The worm G now slowly feeds the calcic carbid from chamber D past valve or door $G^3$, which calcic carbid drops into the water in tank A, the water which operates wheel H thereupon passing through pipe B into tank A, the excess of water issuing from the tank through pipe C, thereby creating a current of water in said tank and keeping up a fresh supply as the worm G operates. When the calcic carbid is dropped into the water in tank A, as stated, decomposition of the carbid immediately takes place, the oxygen of the water combining with the calcium of the calcic carbid and forms calcic oxid or lime, which passes through the perforated shelf or grating $A^2$ and drops on the shelf or plate $A^3$ and is carried away by the current of water issuing from pipe C. The hydrogen of the water unites with the carbon of the calcic carbid to form acetylene gas, which rises from the water into the upper space of the tank A. The cock $t$ being opened at a suitable time allows the acetylene gas so generated to pass through the service-pipe T. If the gas is not consumed as fast as generated, it will fill the receiver or holder U, and as its pressure increases the cover $U^2$ will be raised. When cover $U^2$ rises sufficiently high to lift weight $S^2$, the cock S will close, and thus stop the wheel H and worm G, thereby also stopping the generation of the acetylene gas. As soon as enough gas has been drawn from receiver or holder U to allow cover $U^2$ to descend sufficiently to relieve weight $S^2$ the latter acts to open valve S to again start the worm G to supply more calcic carbid to tank A to evolve more acetylene gas, and so on.

From the above it will be understood that the process of generating the acetylene gas as used is practically automatic, for when its volume and pressure increase beyond a certain point the supply of calcic carbid is stopped and when the pressure decreases the generation of the gas again commences, and so on, commensurate with the consumption of the gas. If for any reason the pressure of the gas in tank A increases unduly, the diaphragm P will rise, thus allowing the valve $O^2$ to close to stop the supply of water to wheel H and tank A, while at the same time pawl N instantly stops the rotation of wheel H, the valve R thereupon also opening to allow water to issue from tank A, whereby a greater space for the gas in the tank or generator A is provided, and its pressure thereby decreases.

When in this specification I refer to "calcic carbid," I use said term generically as embracing an alkali-metal or alkaline-earth-metal carbid which will evolve acetylene gas when brought in contact with water or its vapor or with compounds containing an easily-separated water molecule, such as hydrates.

I do not limit my invention to the precise details of construction and operation set forth, as they may be changed or varied without departing from the spirit of my invention.

Having now described my invention, what I claim is—

1. The method of generating acetylene gas consisting in supplying new charges of water and calcic carbid simultaneously to a tank or reservoir in proportion to the gas evolved and removed, and regulating the supply of both the water and the carbid by the pressure of the gas evolved.

2. The method of generating acetylene gas consisting in supplying water to a tank or reservoir and simultaneously feeding calcic carbid to said water in the tank by the passage of the water thereto to evolve acetylene gas, in removing the water from the tank in proportion as it enters the same to keep up a fresh supply of water for the incoming calcic carbid, in removing the gas from the tank, and in checking or stopping the supply of water and calcic carbid to said tank by pressure generated by said gas.

3. In an apparatus for generating acetylene gas from calcic carbid, the combination of a tank or reservoir, a pipe, valve and feeding devices for simultaneously supplying it with calcic carbid and water, with devices for simultaneously regulating or stopping said supply of both the calcic carbid and water when the gas generated exceeds a predetermined quantity or pressure, whereby the generation of the gas can be automatically regulated in accordance with the quantity used, substantially as described.

4. In an apparatus for generating acetylene gas from calcic carbid, the combination of a tank or reservoir, a pipe, and a valve operated by gas-pressure for supplying a current of fresh water into and through the tank, devices for supplying consecutive charges of calcic carbid to the water in said tank, and means for regulating the supply of both water and carbid to the tank by the pressure of the gas evolved, substantially as described.

5. In an apparatus for generating acetylene gas from calcic carbid, the combination of a tank or reservoir, a chamber connected therewith adapted to contain calcic carbid, means for feeding calcic carbid therefrom to said tank, means for feeding water to said tank to receive said calcic carbid to decompose it and evolve acetylene gas, and means for removing the water from said tank, and devices operated by the pressure of gas in the generator tank or reservoir to regulate the supply of water thereto, and also to regulate the supply of carbid to said tank or reservoir, substantially as described.

6. In an apparatus for generating acetylene gas from calcic carbid, the combination of a tank or reservoir, a chamber connected therewith to contain calcic carbid, a worm or screw to feed calcic carbid to said tank, means to supply water to said tank to receive said calcic carbid to decompose the latter and evolve acetylene gas, and devices for causing said worm or screw to feed calcic carbid to said tank, substantially as described.

7. In an apparatus for generating acetylene gas from calcic carbid, the combination of a tank or reservoir, a chamber connected therewith to contain calcic carbid, a worm or screw to feed calcic carbid to said tank, a water-wheel to operate said worm or screw and means for operating said wheel by water and for conveying the water into said tank when it passes from said wheel, substantially as set forth.

8. In an apparatus for generating acetylene gas from calcic carbid, the combination of a tank or reservoir, a chamber connected therewith to contain calcic carbid, a worm or screw for feeding calcic carbid from said chamber to said tank or reservoir, a water-wheel connected with said worm or screw, a pipe to supply water to said wheel, a hopper to receive the water from said wheel and a pipe leading from said hopper to said tank, whereby the water that operates said worm also receives the calcic carbid to evolve acetylene gas, substantially as described.

9. In an apparatus for generating acetylene gas from calcic carbid, the combination of a tank or reservoir, a chamber connected therewith to contain calcic carbid, a worm or screw for feeding calcic carbid from said chamber to said tank or reservoir, a water-wheel connected with said worm or screw, a pipe to supply water to said wheel, a hopper to receive the water from said wheel and a pipe leading from said hopper to said tank, whereby the water that operates said worm also receives the calcic carbid to evolve acetylene gas, a diaphragm connected with said tank to be operated by gas-pressure therein, a valve connected with the water-supply pipe and connections between said diaphragm and valve for closing the latter when the gas-pressure in the tank increases, substantially as set forth.

10. In an apparatus for generating acetylene gas from calcic carbid, the combination of a tank or reservoir, a chamber connected therewith to contain calcic carbid, a worm or screw for feeding calcic carbid from said chamber to said tank or reservoir, a water-wheel connected with said worm or screw, a pipe to supply water to said wheel, a hopper to receive the water from said wheel and a pipe leading from said hopper to said tank, whereby the water that operates said worm also receives the calcic carbid to evolve acetylene gas, a diaphragm connected with said tank to be operated by gas-pressure therein, a valve connected with the water-supply pipe, connections between said diaphragm and valve for closing the latter when the gas-pressure in the tank increases, an outlet from said tank, a valve therefor, and a connection from said diaphragm to said valve for opening said valve when the water-supply valve is closed, substantially as set forth.

11. In an apparatus for generating acetylene gas from calcic carbid, the combination of a tank or reservoir, means for feeding calcic carbid and water thereto, means for regulating the supply of both the calcic carbid and the water to said tank by the pressure of the gas evolved and a pipe leading from said tank to convey the gas therefrom directly to the source of consumption, with a gas holder or receiver connected with said pipe by a branch pipe, and means operated by the gas-pressure in said holder or receiver for stopping or checking the supply of calcic carbid to said tank until the gas-pressure in the tank is reduced, substantially as described.

12. In an apparatus for generating acetylene gas from calcic carbid, the combination of a tank or reservoir, means for supplying it with water, devices operated by the passage of water to the tank or reservoir for supplying the latter with calcic carbid, and a valve connected with the water-supply, with a gas holder or receiver, a movable cover therefor and a weight connected with said valve for opening it, said weight being arranged to be lifted by the cover of said holder or receiver by the action of gas-pressure therein to close said valve to stop the supply of calcic carbid to said tank, substantially as described.

WILLIAM A. ROOT.

Witnesses:
T. F. BOURNE,
M. S. O'KUN.